US007385211B2

(12) United States Patent
Derra et al.

(10) Patent No.: US 7,385,211 B2

(45) Date of Patent: Jun. 10, 2008

(54) METHOD OF GENERATING EXTREME ULTRAVIOLET RADIATION

(75) Inventors: Guenther Hans Derra, Aachen (DE); Ulrich Niemann, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 178 days.

(21) Appl. No.: 10/512,616

(22) PCT Filed: Apr. 22, 2003

(86) PCT No.: PCT/IB03/01611

§ 371 (c)(1), (2), (4) Date: Oct. 26, 2004

(87) PCT Pub. No.: WO03/094581

PCT Pub. Date: Nov. 13, 2003

(65) Prior Publication Data

US 2005/0167617 A1 Aug. 4, 2005

(30) Foreign Application Priority Data

Apr. 30, 2002 (DE) ................................ 102 19 173

(51) Int. Cl.
*G01J 3/10* (2006.01)

(52) U.S. Cl. ................................ 250/504 R; 250/493.1

(58) Field of Classification Search ............ 250/504 R, 250/493.1

See application file for complete search history.

(56) References Cited

U.S. PATENT DOCUMENTS

| | | | |
|---|---|---|---|
| 5,499,282 A | 3/1996 | Silfvast | |
| 5,763,930 A | 6/1998 | Partlo | |
| 5,963,616 A | 10/1999 | Silfvast et al. | |
| 6,031,241 A | 2/2000 | Silfvast et al. | |
| 6,051,841 A | 4/2000 | Partlo | |
| 6,064,072 A | 5/2000 | Partlo et al. | |
| 6,353,232 B2 * | 3/2002 | Haas et al. | 250/492.2 |
| 6,552,350 B2 * | 4/2003 | Haas et al. | 250/365 |
| 6,770,896 B2 * | 8/2004 | Schriever | 250/504 R |
| 6,815,900 B2 * | 11/2004 | Ahmad et al. | 315/111.21 |
| 6,977,383 B2 * | 12/2005 | Rieger et al. | 250/398 |
| 2004/0160155 A1 * | 8/2004 | Partlo et al. | 313/231.31 |

FOREIGN PATENT DOCUMENTS

| | | |
|---|---|---|
| DE | 19922566 | 6/2000 |
| JP | 2000091096 A | 3/2000 |
| WO | WO9934395 A1 | 7/1999 |
| WO | WO0199143 A1 | 12/2001 |

OTHER PUBLICATIONS

Bergmann K, et al.: An Extreme Ultrviolet Radiation Source Based on a Gas Discharge Plasma, IEEE Jun. 1999, pp. 283-286, XP010371211.

M Even-Zhoar, et al.: A Study of EUV Spectra in the Fifth Period, vol. 5, Aug. 1972, pp. 1596-1613, XP002250665.

* cited by examiner

*Primary Examiner*—Kiet T. Nguyen

(57) ABSTRACT

A method of generating extreme ultraviolet radiation, wherein the radiant medium is a plasma generated by processing a basic material, and the basic material distribution of the radiant medium consists at least of one halogenide of the metals lithium (Li), indium (In), tin (Sn), antimony (Sb), tellurium (Te), aluminum (Al) and/or a halogen 5 and/or an inert gas, with the exception of halogenides on the basis of lithium (Li) and chlorine (Cl) as well as fluorine (F).

25 Claims, 8 Drawing Sheets

METHOD OF GENERATING EXTREME ULTRAVIOLET RADIATION

The invention relates to a method of generating extreme ultraviolet radiation, wherein the radiant medium is a plasma generated from a basic material distribution.

Such methods are known. They are used, for example, in lithographic projection for the manufacture of semiconductors. For future generations of lithographic projection, an intensive light source for short-wave radiation in the extreme ultraviolet range, hereinafter referred to as EUV, from approximately 5 to 50 nm is required. To be precise, as a result of the availability of efficient multilayer reflectors, the most promising concepts will employ a very narrow wavelength band in the 13.5 nm range. Generally speaking, the aim is to obtain an EUV light source for lithographic applications, which has a high, overall, usable EUV output in the range from 50 W to 100 which output is available upon entering the illumination optical systems, and is necessary to fulfill the throughput conditions of the lithographic process.

In order to be able to fulfill these extremely high requirements, a high overall efficiency of the system is required. The most important factors in respect of the light source are compactness of the radiant volume and a high conversion efficiency of electric input power to EUV radiation.

Various concepts enabling said objects to be achieved are commonly known: synchrotron X-ray sources, laser-produced plasmas, hereinafter referred to as LPP, and discharge sources.

Synchrotron X-ray sources have several disadvantages, which are unacceptable if said sources are to be integrated in a semiconductor manufacturing process. These drawbacks relate to the fact that they are extremely expensive and to substantial requirements regarding the space and/or the position occupied by the source and the associated surrounding equipment.

The sources for laser-generating the plasma for the EUV range employ high-power laser beams which are focused on gaseous, liquid or solid targets and generate a hot plasma emitting the EUV radiation.

The most important drawback of the currently proposed systems is the strong formation of impurities in the form of ions, atoms or particles, which are emitted by the plasma region.

This may result in a rapid degradation of the EUV radiation-collection optics. This problem is most critical for solid targets, but is serious also in the case of liquid or gaseous targets, which are generally emitted by a specific type of nozzle. The oxygen and xenon targets which are most commonly used with LPPs lead to the problem that a conversion efficiency from electric input power to usable EUV output power of approximately 0.25% is achieved, which is very low.

To achieve the necessary EUV levels, a laser beam output of many kilowatts with a pulse frequency above 1 kHz is necessary. These laser systems are not available at present and even if they were available, as a result of dramatic development efforts, they would be very expensive.

Finally, discharge sources generate EUV radiation by means of an electrically driven discharge plasma. Various concepts are currently under discussion, for example capillary discharges, z-pinch discharges as well as hollow cathode-triggered discharges as disclosed, for example, in DE 199 22 566.

The main advantages of the discharge sources are their compactness, comparatively low costs as well as a direct conversion of the stored electric energy, leading to the formation of a hot plasma that generates EUV.

For most LPP and discharge EUV sources xenon is used as the radiant medium. In spite of the comparatively high conversion efficiency in comparison with other radiant gases, the absolute conversion efficiency for Xe sources is approximately 0.5% at the most. Taking into account substantial EUV light losses inside the light-collection and light-projection optical systems as well as the EUV intensity necessary at wafer level, the source must supply approximately 100 W EUV power from a very small radiant volume. Division of the necessary power by the conversion efficiency indicated above results in a necessary input power for all Xe sources of at least 20 kW, which power must be supplied by a laser or by an electric discharge. This leads to serious technological problems.

The conditions to be fulfilled by the laser system or the electrode discharge system can be noticeably eased if radiators that are much more effective can be used in the plasma-forming process.

Various authors proposed the use of lithium-metal vapor as a high-efficiency EUV radiator. For example Partlo et al. in U.S. Pat. Nos. 6,064,072, 6,051,841, 5,763,930, Silfvast et al. in U.S. Pat. Nos. 6,031,241, 5,963,616, 5,499,282 and WO 99/34395. Also tin was proposed as an efficient EUV radiator for laser-generated plasma sources, for example, by T. Tomie et al. in Second Int. Sematec, a Workshop on EUV Lithography, San Francisco, October 2000.

In accordance with the prior art described above, only metal vapors from lithium or tin were used as the radiant medium. It is known, however, that the evaporation of lithium requires very high temperatures of the discharge system. The evaporation of tin requires even higher temperatures, which cannot easily be realized in a possible gas discharge source. The metal vapors will be available not only in the plasma volume but also in at least a part of the inner volume of the source. If the inner parts of the source, which are in contact with the metal vapor, are not hot enough, condensation of the metal occurs. This will most probably lead to a rapid system error. Even if condensation can be precluded, serious other problems relating to corrosion of the inner parts of the source caused by the hot metal vapor could occur, which is commonly know particularly in the case of lithium.

Therefore, it is an object of the invention to provide a method of the type mentioned in the opening paragraph, which enables reliable plasma production for EUV generation using simple technical means and avoids prior art drawbacks.

In the method of the type mentioned in the opening paragraph this object is achieved in accordance with the invention in that the basic material distribution of the radiant medium comprises at least one halogenide of the metals lithium (Li), indium (In), tin (Sn), antimony (Sb), tellurium (Te), aluminum (Al) and/or a halogen and/or an inert gas, with the exception of halogenides on the basis of lithium (Li) and chlorine (Cl) as well as fluorine (F).

The use of said media to generate EUV radiation by means of a plasma has the important advantage that a predetermined vapor pressure can be generated at a temperature that is substantially lower than the temperature that is required if pure metal vapors are used. This leads to a substantial reduction of the necessary power. If, however, the plasma must be generated at a specific temperature, then this can be carried put by means of the media in accordance with the invention at a substantially higher vapor pressure.

In accordance with a further advantageous embodiment of the invention, EUV radiation in the range from approximately 5 nm to approximately 50 nm is generated. It is thus ensured that the wavelength necessary for lithography is attained.

Furthermore, the generation of a plasma with an electron temperature of at least 10 eV corresponding to approximately 116,000 K is advantageously made possible. As a result, effective radiation in the EUV range is achieved.

In accordance with a further advantageous embodiment, at least an inert gas is added to the basic material distribution.

To further increase the temperature advantage, it is advantageous to add at least a further halogenide as a so termed "evaporator" to the basic material distribution.

It is particularly advantageous if said further halogenide is a metal-based halogenide.

In order to further reduce the risk of condensation and/or corrosion of the plasma-generating assembly, it may be advantageous to add at least a pure halogen to the basic material distribution in a quantity such that an oversaturation condition of the halogen is obtained.

To achieve a high optical efficiency of the lithographic illumination and projection optical system, it is advantageously proposed that the emission volume of the extreme ultraviolet principal radiation is below 30 mm.sup.3.

Furthermore, in accordance with an embodiment of the invention, the extreme ultraviolet radiation is emitted in a wavelength range from 10 to 15 nm.

This is advantageous in particular for newer generation-lithographic processes wherein Mo—Si multilayer mirrors are used.

Furthermore, the means used for generating the EUV radiation-emitting plasma volume is a discharge taking place between two electrodes.

In accordance with the invention it is also possible that the means for generating the EUV radiation-emitting plasma volume is at least one laser beam (e.g. 7 in FIG. 8).

It is particularly advantageous if the mean pressure of the metal halogenide, the iodine or another metal halogenide lies in the range from approximately 1 to 1000 Pa.

The plasma can be advantageously generated if the basic material distribution comprises at least a metal halogenide in liquid form, i.e. as droplets or as a jet.

Furthermore, in accordance with another embodiment, it is advantageous if the basic material distribution comprises solid metal halogenide particles, which are transported in a gas stream.

A large variation range of an adapted application is obtained if the basic material distribution is at least partly gaseous.

Furthermore, it is advantageously possible for the plasma to be generated in the pulsed mode; however it may alternatively be generated in the continuous mode of operation.

It is additionally possible that the plasma is generated by a hollow cathode-triggered discharge in a device 9 (in FIG. 7) with an anode electrode 1*a*, cathode electrode 1*b*, plasma volume 4 and hollow cathode volume 6.

In accordance with a further embodiment of the method, the plasma is formed by a pinch discharge.

WO 01/99143 A1 discloses the formation of halogenides on the basis of lithium with chlorine and fluorine. However, these halogenides exhibit clearly worse vapor pressures than pure lithium. This is shown, inter alia, in FIG. 1.

These and other aspects of the invention are apparent from and will be elucidated with reference to the embodiment(s) described hereinafter.

Hereinbelow a description is given of various examples, with reference to FIGS. 1 to 5, wherein inter alia the chemical equilibriums of complex gas phases lead to novel attractive possibilities by means of which the problems in connection with metallic lithium or metallic tin vapor can be reduced substantially, if not completely. Novel possibilities of EUV radiators are given which are based on lithium, tin or other compounds, or also on pure elements.

As partly set forth hereinabove, it is an object of the invention to provide:

novel methods of using lithium (Li) as a radiator in an EUV source;

novel methods of using tin (Sn) as a radiator in an EUV source;

novel methods of using lithium (Li) and tin (Sn) as radiators in an EUV source at temperatures below those required for a pure metal compound;

novel methods of using lithium (Li) and tin (Sn) as radiators in an EUV source, leading to a reduced risk of corrosion as compared to that when use is made of pure metals; and novel methods of using other elements of the fifth period of the periodic system as efficient EUV radiators.

These objects were achieved, inter alia, by supplying the discharge source with lithium (Li) and tin (Sn) not in the form of pure metal vapor but in the form of various lithium or different halogenides, whether or not together with other existing metallic halogenides.

Figure 1:
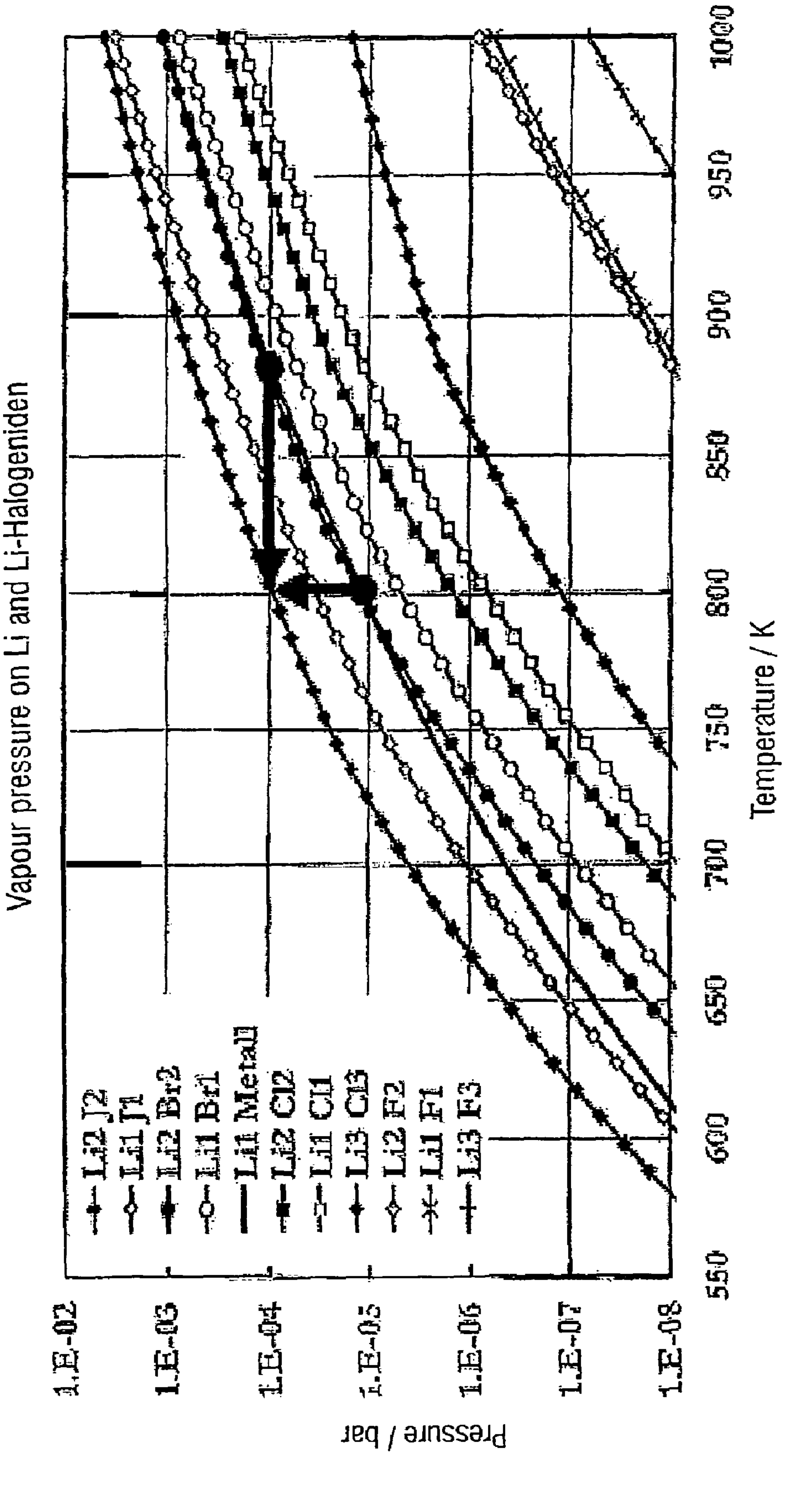
FIG. 1 shows vapor pressures of metallic lithium and lithium halogenides in dependence upon the temperature.
Figure 2:
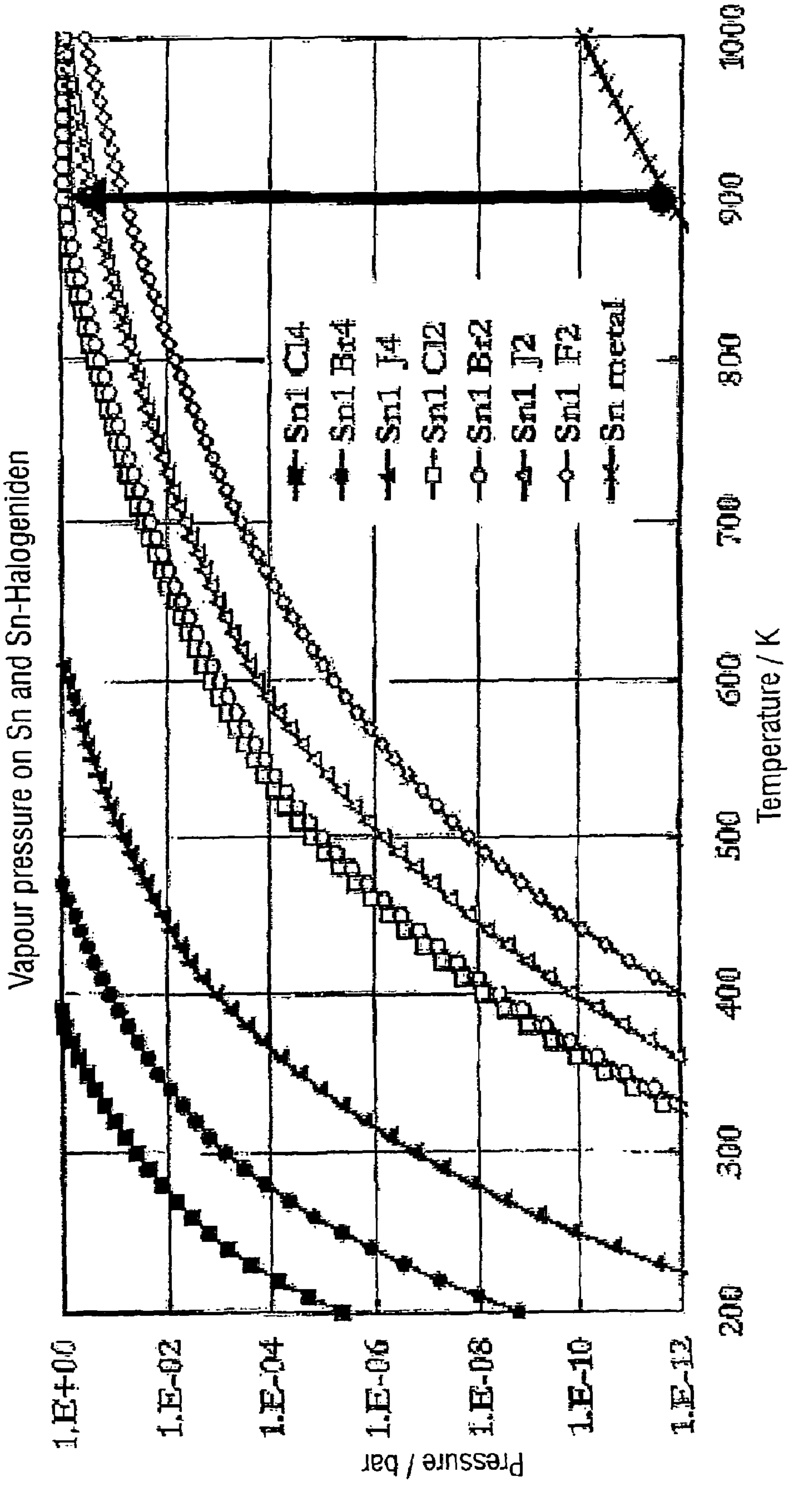
FIG. 2 shows vapor pressures of metallic tin and tin halogenides plotted versus temperature.

First the vapor pressure of individual lithium and tin halogenides is considered. As shown in FIGS. 1 and 2, the vapor pressure of the halogenides of lithium and tin can be much higher than that of pure metals. In the case of lithium shown in FIG. 1, for example lithium iodide can be used as the radiation medium, which is present in the gas phase as a monomer (LiJ)-dimer (Li.sub.2J.sub.2) equilibrium. An overall pressure of lithium-containing elements of the order of 10.sup.-4 to 10.sup.-3 bar, which is a typical pressure range for the generation of EUV by means of gas discharge cells, can be attained at a temperature that is approximately up to 90 K lower than that necessary for the evaporation of pure metal. At a specific temperature, the overall pressure of the lithium-containing elements is one order of magnitude higher than the vapor pressure of the pure metal in the corresponding temperature zone.

The halogenides shown in FIG. 1 are Li.sub.2J.sub.2, Li.sub.1J.sub.1, Li.sub.2Br.sub.2 and Li.sub.1Br.sub.1, which are compared with the pure metal Li. As shown in FIG. 1, the dimer of lithium iodide, i.e. Li.sub.2J.sub.2 is most advantageous. The vapor pressure values of the halogenides on the basis of lithium and chlorine or fluorine however are clearly worse than the vapor pressure of pure lithium.

As regards the use of tin in the case shown in FIG. 2, a vapor pressure of 10.sup.-4 to 10.sup.-3 bar can be attained using, for example, tin chloride (SnCl.sub.2) or tin bromide (SnBr.sub.2) at a temperature in the range from approximately 550 K to 600 K In the case of quadrivalent tin halogenides, for example SnCl.sub.4, SnBr.sub.4 and SnJ-.sub.4, this can even be attained at temperatures below 400 K. This temperature is very much lower than the temperature necessary for the evaporation of the pure metal. At a specific temperature, approximately 900 K in the case shown in FIG. 2, the vapor pressure of SnCl.sub.2 or SnBr.sub.2 is more than 10 orders of magnitude higher than that of pure tin metal.

FIG. 2 shows the halogenides tin fluoride (SnF.sub.2), tin chloride (SnCl.sub.2) and (SnC.sub.4), tin bromide (SnBr-.sub.2) and (SnBr.sub.4) as well as tin iodide (SnJ.sub.2) and (SnJ.sub.4) versus pure tin metal.

Figure 3:
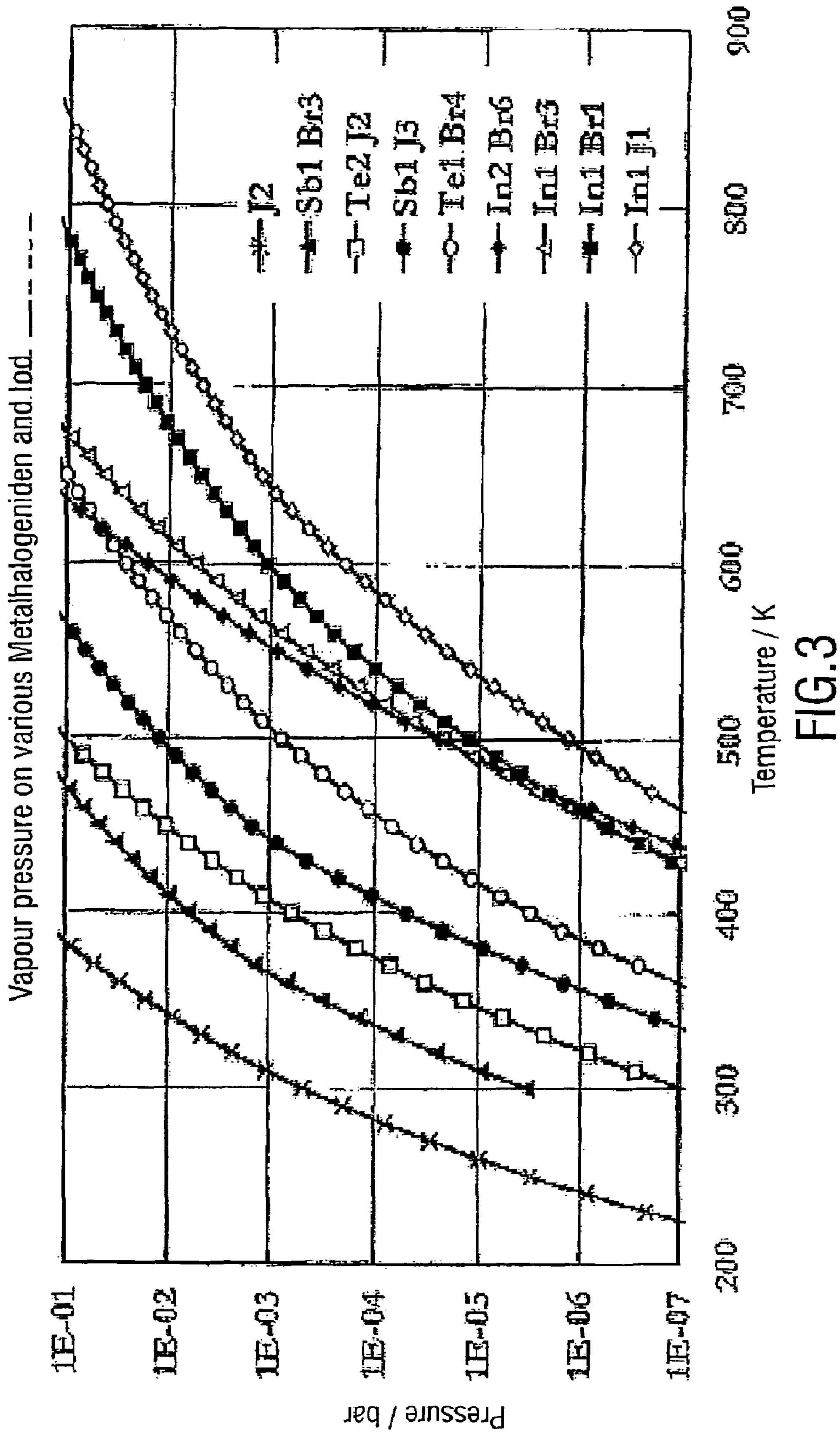
FIG. 3 shows vapor pressures of different EUV-emitting halogenides and pure iodine plotted versus temperature.

As is also shown in FIG. 3, in addition to the halides or halogenides of lithium or/and tin which are known to be used as EUV radiators, also other halogenides can be used as efficient EUV radiators. In particular the elements indium (In), antimony (Sb) and tellurium (Te) show radiation bands in the EUV range. Also for these elements there are halogenides with a high vapor pressure, which leads to a simplified evaporation of sufficiently large quantities in the discharge volume. The temperatures necessary to evaporate sufficient metal halogenide for an EUV-emitting plasma range between 300 K and 600 K.

In addition to said metal halogenides, also elementary iodine (J) can be used as an EUV radiator. The vapor pressure of iodine is very high even at room temperature (cf. FIG. 1). As a result, also a pure halogen can be used as an attractive radiator.

The halogenides shown in FIG. 3 are antimony bromide (SbBr.sub.3), tellurium iodide (Te.sub.2J.sub.2), antimony iodide (SbJ.sub.3), tellurium bromide (TeBr.sub.4), indium bromide (InBr, InBr.sub.3, InBr.sub.6), indium iodide (InJ) and, compared to pure iodine, in this case even J.sub.2.

In addition to pure metallic halogenides also combinations of metallic halogenides can be used. It has surprisingly been found that this can further improve the effective pressure of lithium or tin to a value which exceeds even the pressure that can be attained when use is made of only a halogenide or a pure halogenide. This effect can be attributed to the formation of so-termed "heterocomplexes" in the gas phase.

Figure 4:
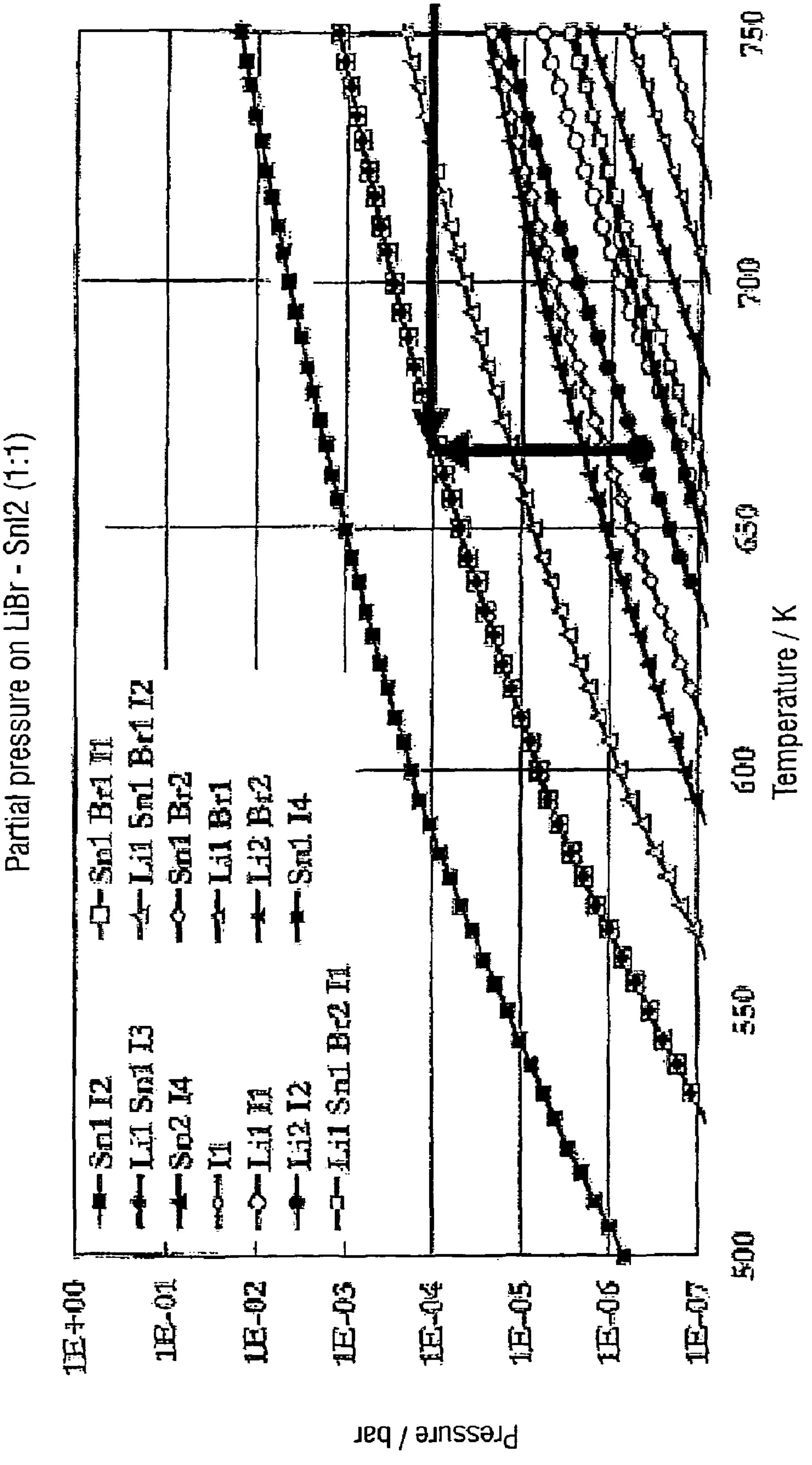
FIG. 4 shows examples of the gas phase composition versus vapor pressures in the case of a mixture of lithium bromide and tin iodide phases of equal molar quantity.

FIG. 4 shows an example of a mixture of equal molar quantities of lithium bromide and tin iodide, use being made of a known method of calculating chemical equilibriums. FIG. 4 shows in detail the complex composition of the resultant gas phase versus the two halogenides. In respect of the EUV discharge source, the most relevant curves are those that relate to lithium or tin-containing chemical compositions.

As is indicated by means of arrows, in comparison with FIG. 1, the temperature necessary to convert the lithium-containing substances to the gas phase at a vapor pressure of 10-4 bar has been reduced from 800 K to 670 K, which can be attributed to the formation of the gas phase of the complex lithium tin iodide (LiSnJ.sub.3). In other words, the effective pressure of the lithium-containing compositions is improved or increased by more than two orders of magnitude.

Figure 5:
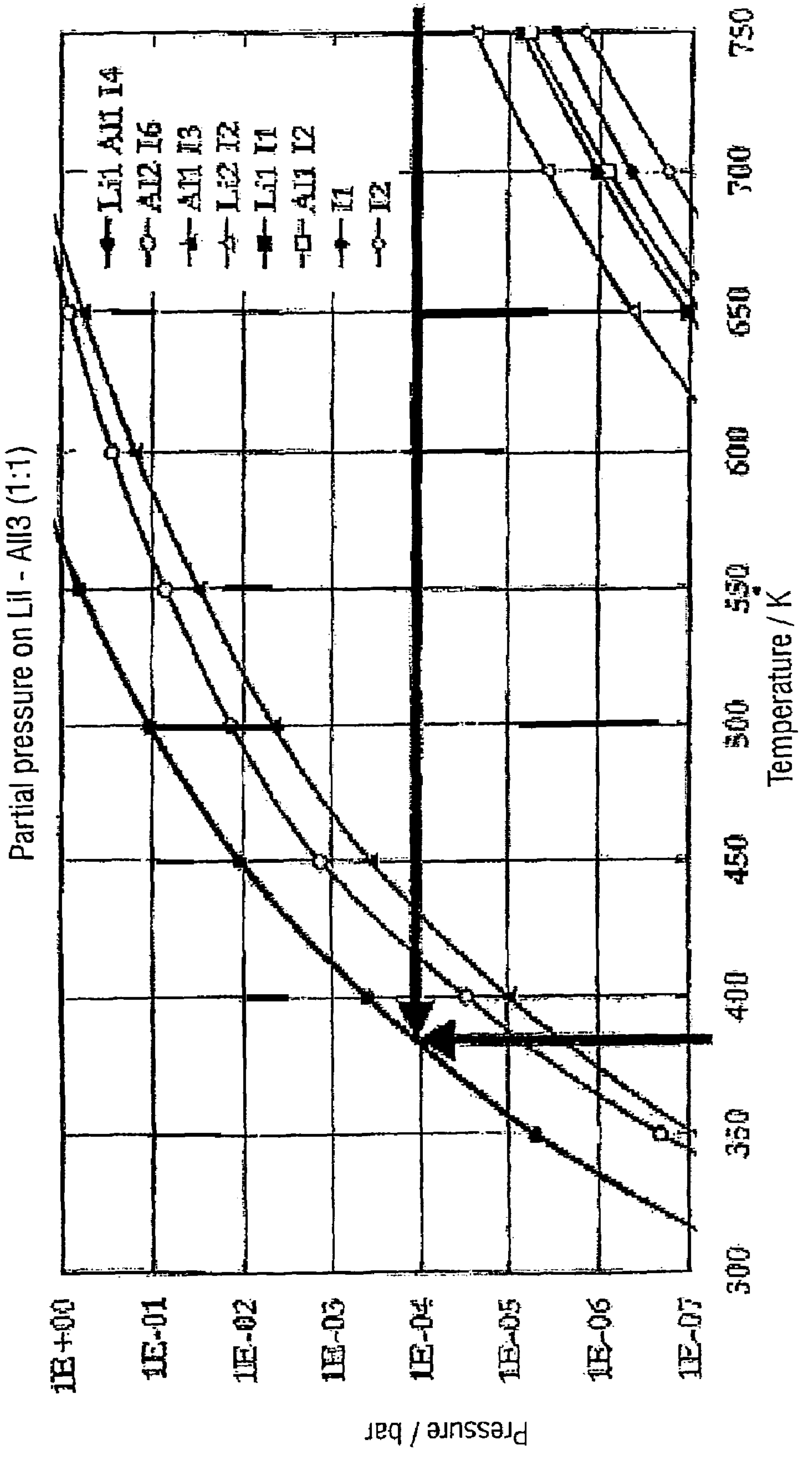
FIG. 5 shows examples of the gas phase composition versus vapor pressures in the case of a mixture of lithium iodide and aluminum iodide phases of equal molar quantity.

An even more efficient example in respect of the increase of the effective pressure of lithium-containing compositions is shown in FIG. 5. Instead of tin iodide (SnJ.sub.2), aluminum iodide (AlJ.sub.3) is used as a so-termed "evaporator" to build up a high gas phase complex pressure of lithium. As is shown in FIG. 5 by means of the arrows, in comparison with FIG. 1, the temperature necessary to attain 10.sup.-4 bar for lithium-containing compositions in the gas phase has now been reduced from 800 K to 380 K by the formation of the gas phase of the lithium aluminum iodide complex (LiAlJ.sub.4). The lithium pressure is improved by several orders of magnitude with respect to pure lithium iodide, which can be attributed to the formation of the gas phase complex with aluminum.

Figure 6:
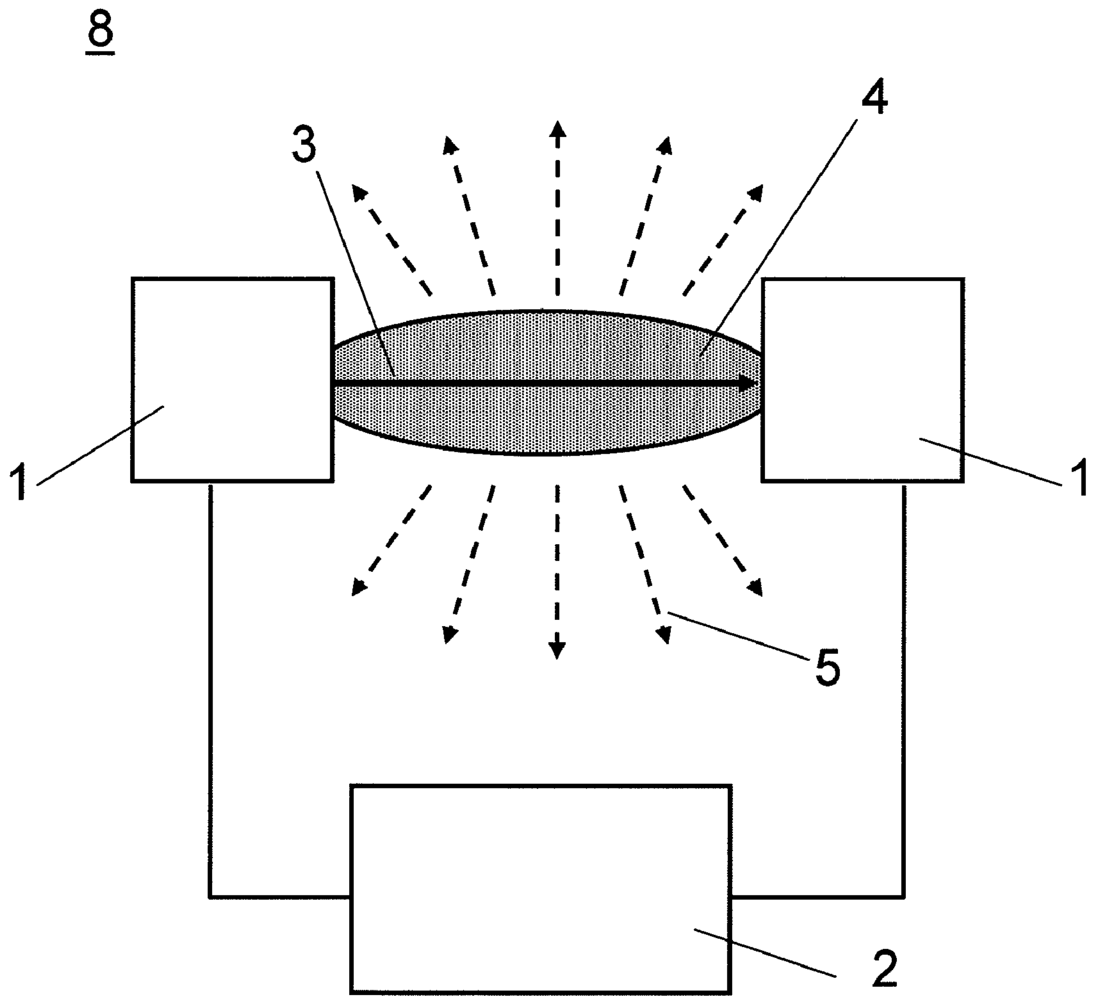
FIG. 6 shows principal components of a discharge plasma source.
Figure 7:
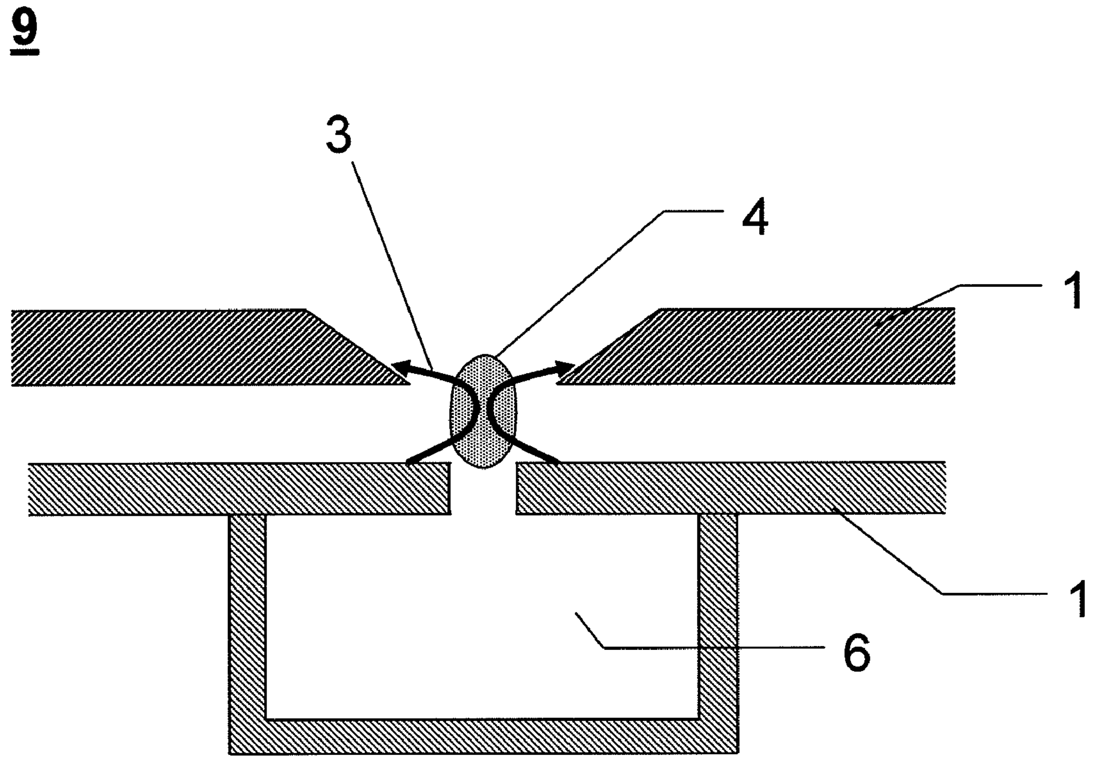
FIG. 7 shows an example of an electrode system of a hollow cathode triggered discharge plasma source.
Figure 8:
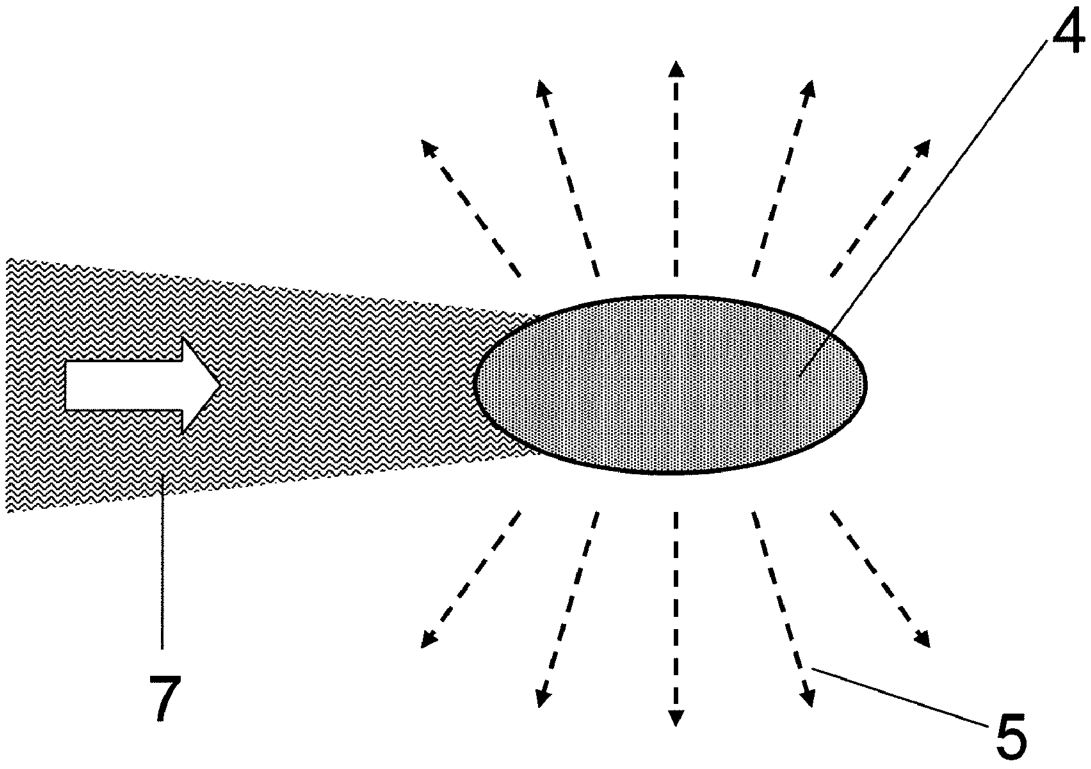
FIG. 8 shows principal components of a laser-produced plasma source.

The invention is not limited to said two examples. Other molar filling ratios of the halogenides are also possible and yield good results. In addition, the selection of metal halogenides containing lithium or tin as well as the selection of "evaporating" metal halogenide, such as tin halogenide or aluminum halogenide, is not limited to the examples of the metal halogenides given hereinabove. The entire range of metallic halogenides and of combinations thereof is possible, including "evaporator" halogenides of, for example, gallium, indium, thallium etc., to obtain a sufficiently increased pressure of lithium or tin-containing compositions in the plasma volume containing at least one radiant medium (e.g. 4 in FIGS. 6, 7 and 8), which is used to generate EUV radiation (e.g. 5 in FIGS. 6 and 8).

It is known that the high temperatures within the EUV-generating plasma may cause molecules, such as metallic halogenides, to decompose into their elementary constituents. After they have left the plasma region, said constituents may recombine to their original metallic halogenide form. This may occur in the gas volume as well as at the walls of the device, for example in the light emitting devices 8 and 9 shown respectively in FIGS. 6 and 7, at the electrodes 1 driven by electrical power supply 2 in FIG. 6 or anode electrode 1*a* and cathode electrode 1*b* in FIG. 7) in the case of an electric discharge 3 (in FIGS. 6 and 7), which may include a pinch discharge. In many cases however the operating pressure is very low. For example the average free path of the atoms and molecules may be large as compared to the dimensions of the source system. As a result, the recombination of the constituents of the original metallic halogenides may be incomplete. This may possibly lead to the formation of layers or films of metallic constituents near the plasma region, for example at the electrodes of the electric discharge device.

This problem can be precluded by means of an oversaturation of halogens in the system. The additional halogen causes the probability of recombination of the metal and the halogen to be increased, thereby removing the metallic constituents by the formation of volatile metallic halogenides. In this manner, undesirable soiling layers of metallic halogenide constituents can be precluded. In addition, the effective concentration of the metallic halogenide in the region of the plasma can be increased.

As regards the concept and the operation of a plasma-based generation of EUV radiation using the above-mentioned constituents, the following advantages can be achieved:

The temperature necessary to evaporate the radiant constituents can be noticeably reduced or, equivalent thereto, the pressure or the density of the radiant constituents can be substantially increased. This leads to a substantial reduction of the technical problems associated with the generation and maintenance of hot metal vapors.

The temperature level, which is necessary to preclude undesirable condensation of metal vapor, can be significantly reduced. This leads to a source design that is technically simpler and to a smaller thermal load on the source materials.

As a result of said possible lower temperature level, corrosion problems due to aggressive metal vapors can be avoided. As a result the failure risk of the source can be substantially reduced.

An increased pressure or an increased density of the radiant constituents leads to a higher EUV-generation efficiency.

The invention claimed is:

1. A method of generating extreme ultraviolet radiation, comprising:

providing a radiant medium having a basic material distribution, the basic material distribution including at least one halogenide of a metal which is selected from the group consisting of lithium (Li), indium (In), tin (Sn), antimony (Sb), tellurium (Te) and aluminum (Al), the halogenide not being a halogenide of chlorine (Cl) or fluorine (F) when the metal selected is lithium (Li), or including a halogen and said at least one halogenide of a metal, except for those combinations of halogenides and halogens wherein said halogen is chlorine (Cl) or fluorine (F) and the selected metal of the at least one halogenide of a metal, is lithium (Li), and, generating a plasma of such radiant medium.

2. The method of claim 1, wherein extreme ultraviolet radiation is generated in the range from approximately 5 nm to approximately 50 nm.

3. The method of claim 1, wherein a plasma with an electron temperature of at least 10 eV is generated.

4. The method of claim 1, wherein at least an inert gas is added to the basic material distribution.

5. The method of claim 1, wherein an evaporating halogenide is added to the basic material distribution.

6. The method of claim 5, wherein said evaporating halogenide is a metal-based halogenide.

7. The method of claim 6, wherein said metal-based halogenide is a halogenide of gallium (Ga), indium (In) or thallium (Ti).

8. The method of claim 1, wherein at least a pure halogen is added to the basic material distribution in a quantity such that an oversaturation condition of the halogen is obtained.

9. The method of claim 1, wherein the main emission volume of the extreme ultraviolet radiation is below 30 $mm^3$.

10. The method of claim 1, wherein the extreme ultraviolet radiation is emitted in a wavelength range from 10 to 15 nm.

11. The method of claim 1, wherein the step of generating a plasma of such radiant medium comprises generating the extreme ultraviolet radiation from a discharge taking place between two electrodes.

12. The method of claim 1, wherein the means for generating the EUV radiation-emitting plasma volume is at least one laser beam.

13. The method of claim 1, wherein a mean vapor pressure of the metal halogenide lies in the range from approximately 1 to 1000 Pa.

14. The method of claim 1, wherein the basic material distribution comprises at least a metal halogenide in liquid form.

15. The method of claim 13, wherein the step of providing the radiant medium includes providing said liquid form as one or more droplets or a jet.

16. The method of claim 1, wherein the basic material distribution comprises solid or liquid metal halogenide particles, and the step of providing the radiant medium includes providing said solid or liquid particles in a gas stream.

17. The method of claim 1, wherein the basic material distribution is at least partly gaseous.

18. The method of claim 1, wherein the plasma is generated in a pulsed mode of operation.

19. The method of claim 1, wherein the plasma is generated in a continuous mode of operation.

20. The method of claim 1, wherein the plasma is generated by a hollow cathode-triggered discharge.

21. The method of claim 1, wherein the plasma is formed by a pinch discharge.

22. The method of claim 20 wherein generating the plasma in the radiant medium comprises generating the plasma at a temperature of 200-850° K at a $10^{-8}$ to 1 bar partial pressure of metal halogenide.

23. A light emitting device generating extreme ultraviolet radiation, the device comprising:

a radiant medium capable of being excited to a plasma state, the radiant medium having a basic material distribution which includes:

(i) at least one halogenide of a metal selected from the group consisting of lithium (Li), indium (In), tin (Sn), antimony (Sb), tellurium (Te), aluminum (Al), or (ii) a halogen and said at least one halogenide of a metal, (iii) except for those combinations of halogenides and halogens wherein said halogen is one of chlorine (Cl) and fluorine (F) and the selected metal is lithium (Li), and (iv) except for those combinations of halogenides and halogens wherein the at least one halogenide is a halogenide of chlorine (Cl) or fluorine (F), and said selected metal is lithium (Li).

24. The light emitting device of claim 23 wherein the device is configured to maintain the plasma at a temperature of 200-850° K at a $10^{-8}$ to 1 bar partial pressure of metal halogenide.

25. A method of generating extreme ultraviolet radiation, comprising:

providing a radiant medium having a basic material distribution, the basic material distribution including iodine (I), and, generating a plasma of such radiant medium, wherein a mean vapor pressure of the iodine lies in the range from approximately 1 to 1000 kPa.

* * * * *